US005826964A

United States Patent [19]

Cejnek et al.

[11] Patent Number: 5,826,964

[45] Date of Patent: Oct. 27, 1998

[54] HEADLAMP WITH COMPLEX REFLECTOR

[75] Inventors: Milan Cejnek; Dana Pekárková, both of Nový Jicín, Czech Rep.

[73] Assignee: Autopal s.r.o., Novy Jicin, Czech Rep.

[21] Appl. No.: 787,590

[22] Filed: Jan. 22, 1997

[30] Foreign Application Priority Data

Jan. 29, 1996 [CZ] Czech Rep. ............................ 257-96

[51] Int. Cl.$^{6}$ ............................ B60Q 1/00; F21V 7/00

[52] U.S. Cl. ......................... 362/61; 362/297; 362/346; 362/347

[58] Field of Search ......................... 362/61, 346, 297, 362/347

[56] References Cited

U.S. PATENT DOCUMENTS

| | | | |
|---|---|---|---|
| 1,385,429 | 7/1921 | Crockett et al. . | |
| 3,700,883 | 10/1972 | Donohue et al. | 362/61 |
| 4,704,661 | 11/1987 | Kosmatka | 362/61 |
| 4,754,374 | 6/1988 | Collot | 362/61 |
| 4,772,988 | 9/1988 | Brun | 362/61 |
| 4,899,261 | 2/1990 | Blusseau et al. | 362/61 |
| 4,924,359 | 5/1990 | Lindae et al. | 362/61 |
| 4,928,214 | 5/1990 | Oyama | 362/61 |
| 5,086,376 | 2/1992 | Blusseau | 362/61 |
| 5,215,368 | 6/1993 | Neumann | 362/61 |
| 5,406,464 | 4/1995 | Saito | 362/61 |
| 5,450,294 | 9/1995 | Hogrefe | 362/51 |
| 5,483,430 | 1/1996 | Stapel et al. | 362/348 |
| 5,519,589 | 5/1996 | Nino | 362/61 |
| 5,556,194 | 9/1996 | Natsume et al. | 362/299 |
| 5,567,044 | 10/1996 | Lopez | 362/297 |

FOREIGN PATENT DOCUMENTS

| | | |
|---|---|---|
| 0 257 946 A2 | 3/1988 | European Pat. Off. . |
| 0 384 589 A1 | 8/1990 | European Pat. Off. . |
| 0645578 | 3/1995 | European Pat. Off. . |
| 2 107 896 | 5/1972 | France . |
| 39 00 910 A1 | 7/1989 | Germany . |
| 3900910 | 7/1989 | Germany . |
| 2155608 | 9/1985 | United Kingdom . |

*Primary Examiner*—Ira S. Lazarus
*Assistant Examiner*—Ljiljama V. Ciric
*Attorney, Agent, or Firm*—Notaro & Michalos P.C.

[57] ABSTRACT

A headlamp has a complex reflector, a refractor, and a light source. The refractor is composed of upper and lower paraboloidal segments shaped such that the focal distance of the upper paraboloidal segment is shorter than the focal distance of the lower segment. The segments are provided with optical elements in the form of parabolic cylinders with a horizontal forming axis. The profile of the parabolic cylinders form is identical to the profile of the paraboloidal segments. The axis of the light source is located above the axis of the headlamp and the focii of the upper and lower paraboloidal segments are located adjacent the light source end faces.

7 Claims, 1 Drawing Sheet

HEADLAMP WITH COMPLEX REFLECTOR

FIELD AND BACKGROUND OF THE INVENTION

This invention relates to headlamps for motor vehicles, where a system with a complex reflector, a refractor and a light source is provided, whereby this system creates a cut-off between light and darkness, to which the light flux is concentrated and a light beam side-spread is made directly by the reflector with out any effects of the refractor optical elements on light spread. By concentrating the light flux in the upper part of the light beam its photometric range is increased and, thereby, visibility is improved and a safe speed for a vehicle being driven in low light conditions equipped with such headlamps in higher.

Prior known headlamps use an internal bulb shield to create a cut-off between light and darkness or a shield between the reflector and lens in the case of projection systems. The side-spread is usually obtained using vertical strip flutes on the refractor. A known disadvantage of the solution where a cut-off between light and darkness is created by a shield is the luminous efficiency of such a headlamp is decreased due to shielding of a part of the light beam coming from the light source.

In the case of the side-spread being created by refractor strip flutes, and the light beam is formed by a parabolic reflector, and the shape is not corrected, its maximum luminous intensity can be found its central area. As a result, the maximum light flux does not impinge into the area of maximum visibility distance at the upper part of the light beam. Instead, the light beam is stronger at a shorter distance which decreases the visibility distance of the headlamp.

SUMMARY OF THE INVENTION

The above-mentioned drawbacks are overcome by a headlamp according to the invention, which is composed of a reflector provided with two paraboloidal segments connected approximately in a horizontal line, a refractor and a light source. The focal distance of the upper paraboloidal segment is smaller than that of the bottom paraboloidal segment. Spread elements in the form of parabolic cylinders with a horizontal forming axis are formed on the surfaces of both segments. The length of the parabolic cylinders determines the side-spread factor which may be even such that the refractor is not necessarily provided with any optical elements for light spread. The case where the lengths are even is preferable when the refractor is inclined greatly in the horizontal and vertical directions.

The focus positions of the paraboloidal segments with regard to the light source and the light source position with regard to the headlamp axis are determined so that the system forms a cut-off between light and darkness using the reflector without needing to use a shield.

DESCRIPTION OF A PREFERRED EMBODIMENT OF THE INVENTION

Figure 1:
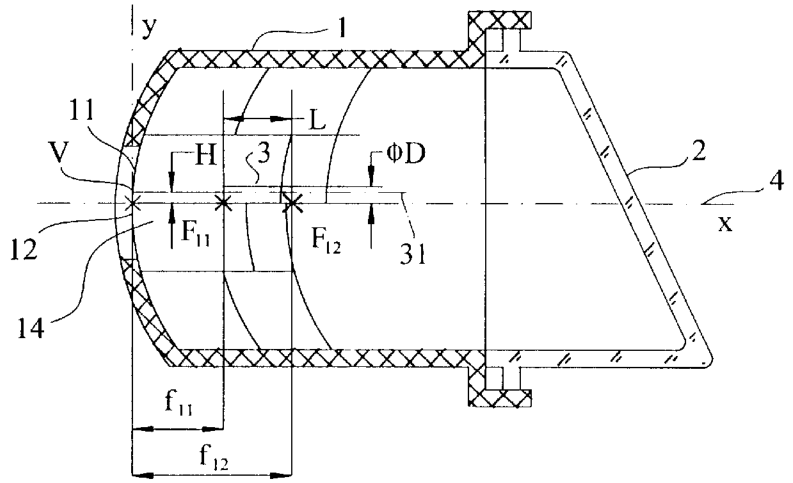
FIG. 1 is a sectional side elevational view taken along vertical section line A—A through the headlamp of FIG. 3.

FIG. 1 shows a headlamp composed of a reflector 1, a refractor 2 and a light source 3.

The reflector 1 is composed of upper paraboloidal segment 11 and bottom paraboloidal segment 12, whereby the focal distance $f_{11}$ of the upper paraboloidal segment 11 is shorter than the focal distance $f_{12}$ of the bottom paraboloidal segment 12. Thus, $$f_{11}<f_{12} \quad (1)$$

The focus $F_{11}$ of the upper paraboloidal segment 11 is located adjacent the light source 3 on the side towards vertex V of the reflector 1. The focus $F_{12}$ of the bottom paraboloidal segment 12 is located adjacent the light source 3 on the side towards the headlamp refractor 2. As shown in FIG. 1, the difference between focal distance $f_{12}$ and of the bottom paraboloidal segment 12 and the focal distance $f_{11}$ of the upper paraboloidal segment 11 is equal to the length L of the light source 3:

$$f_{12}-f_{11}=L \quad (2)$$

When this relationship between the focal distances $f_{11}$, $f_{12}$ is true, the light beam from the upper paraboloidal segment 11 is convergent and the light beam from the bottom paraboloidal segment 12 is divergent. As a result, both light beams are directed to the area under the light and darkness cut-off.

The axis 31 of the light source 3 is situated above the axis 4 of the reflector 1 by the distance H. In the diagram of FIG. 1 this distance H is half of the diameter D of the light source 3:

$$H=D/2 \quad (3)$$

The non-aligned positioning of the light source axis 31 above the reflector axis 4, by separating them by the disalignment distance H improves the sharpness of the cut-off between light and darkness as well as the gradient of illumination of the cut-off by moving the elementary image of the light source 3 such that it just touches the cut-off in the configuration shown in the drawings.

Figure 2:
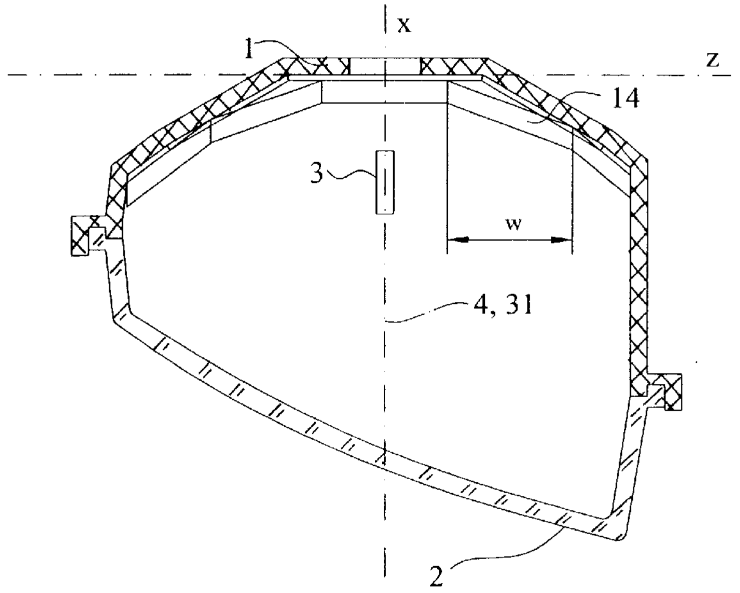
FIG. 2 is a sectional top plan view taken along horizontal section line B—B through the headlamp of FIG. 3.

As seen in FIG. 2, the paraboloidal segments 11, 12 are provided with spread elements 14 in the form of parabolic cylinders with a horizontal forming axis. The controlling curve of the parabolic cylinders 14 of the upper paraboloidal segment 11 is the parabola with focal distance $f_{11}$. The controlling curve fo the parabolic cylinders 14 in the bottom paraboloidal segment 12 is the parabola with focal distance $f_{12}$.

Figure 3:
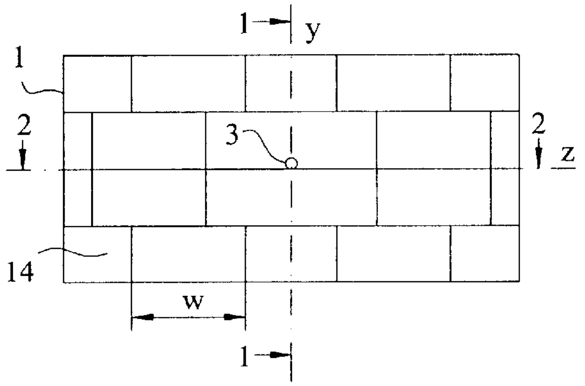
FIG. 3 is a front view of a headlamp according to the invention.

FIGS. 2 and 3 show the width w of the spread elements 14 determines the degree of the light side-spread in relation to the focus distances $f_{11}$, $f_{12}$ of paraboloidal segments 11, 12 of the reflector 1.

Turning to FIG. 3, the spread elements 14 of different width w on the reflector 1 can be arranged in horizontal rows. Beginning from certain width w of the spread elements 14 fo the reflector 1, the refractor 2 is smooth, without any optical elements for spread of the light beam.

As described above, a headlamp geometry arrangement with the given positions of focii $F_{11}$ and $F_{12}$ in relation to light source 3, focal distances $f_{11}$, $f_{12}$, and axis disalignment distance H has the elementary images of the light source 3 in touch with the cut-off of light and darkness and the spread elements 14 provide the necessary side-spread of the light beam by setting their width w appropriately. The photometrical range of the light beam is increased in the case of such a headlamp since the light flux is concentrated at the cut-off between light and darkness. This makes it possible to improve the visibility range as the ability of a person driving an automobile equipped with the headlamps to perceive and recognize obstructions in the path of the automobile is increased by the improved headlamp. Thus, such a headlamp is especially useful in automobiles.

We claim:

1. A headlamp for a motor vehicle, the headlamp comprising:

a reflector formed by upper and bottom paraboloidal segments each having spread elements formed by parabolic cylinders on a horizontal forming axis, a first focal distance of the upper paraboloidal segment being shorter than a second focal distance of the bottom paraboloidal segment;

a refractor positioned opposite the reflector; and a light source having a light source length and a light source diameter, the light source located between the refractor and the reflector.

2. A headlamp according to claim 1, wherein the focus of the upper paraboloidal segment is located between the light source and the reflector adjacent the light source, and the focus of the bottom paraboloidal segment is located between the refractor and the light source adjacent the light source.

3. A headlamp according to claim 1, wherein the a difference between the first and second focal distances is equal to the light source length.

4. A headlamp according to claim 1, wherein a light source horizontal axis is situated above a reflector horizontal axis by a disalignment distance.

5. A headlamp according to claim 4, wherein the disalignment distance is one half of the diameter of the light source.

6. A headlamp according to claim 1, wherein a first curve of the parabolic cylinder spread elements in the upper paraboloidal segment is formed along a parabola having the first focal distance and a second curve of the parabolic cylinder spread elements in the bottom paraboloidal segment is formed along a parabola having the second focal distance.

7. A headlamp according to claim 1, wherein the refractor is smooth and lacks optical elements for diffusing light beams from the reflector.

* * * * *